United States Patent
Zhang et al.

(10) Patent No.: US 11,221,344 B2
(45) Date of Patent: Jan. 11, 2022

(54) THERMAL INSULATION CASING FOR ANALYZER

(71) Applicant: LEADWAY (HK) LIMITED, Hong Kong (CN)

(72) Inventors: Hao Zhang, Zhejiang (CN); Gang Wu, Zhejiang (CN); Haiyan Ji, Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 266 days.

(21) Appl. No.: 16/300,039

(22) PCT Filed: May 12, 2017

(86) PCT No.: PCT/CN2017/084087
§ 371 (c)(1),
(2) Date: Nov. 8, 2018

(87) PCT Pub. No.: WO2017/193988
PCT Pub. Date: Nov. 16, 2017

(65) Prior Publication Data
US 2019/0145994 A1 May 16, 2019

(30) Foreign Application Priority Data

May 12, 2016 (CN) .......................... 201610311323.1

(51) Int. Cl.
*B01L 3/00* (2006.01)
*G01N 35/02* (2006.01)
*G01N 35/00* (2006.01)
*G01N 35/04* (2006.01)

(52) U.S. Cl.
CPC ........... *G01N 35/025* (2013.01); *G01N 35/00* (2013.01); *G01N 2035/00396* (2013.01); *G01N 2035/0441* (2013.01); *G01N 2035/0443* (2013.01)

(58) Field of Classification Search
CPC ............... B01L 1/00; B01L 7/00; B01L 1/025
USPC ................................................. 422/565, 567
See application file for complete search history.

(56) References Cited

U.S. PATENT DOCUMENTS

| 2002/0045265 A1* | 4/2002 | Bergh ................... B01L 7/525 436/37 |
| 2002/0070170 A1 | 6/2002 | Berger et al. |

FOREIGN PATENT DOCUMENTS

| CN | 200955851 Y | 10/2007 |
| CN | 202035150 U | 11/2011 |
| CN | 202041535 U | 11/2011 |
| CN | 102590487 B | 9/2013 |
| CN | 102998473 B | 6/2014 |
| CN | 103867851 A | 6/2014 |
| CN | 203643457 U | 6/2014 |
| CN | 104345158 A | 2/2015 |
| CN | 103599898 B | 11/2015 |
| EP | 0889328 A1 | 1/1999 |
| JP | 2010139332 A | 6/2010 |
| JP | 2016023998 A | 2/2016 |
| WO | 2009044887 A1 | 4/2009 |
| WO | 2017193988 A1 | 11/2017 |

OTHER PUBLICATIONS

Office Action issued by the CNIPA in Chinese Patent Application No. 2016103311323.1 dated Feb. 9, 2018—incl Engl lang translation (13 pages total).

* cited by examiner

*Primary Examiner* — Natalia Levkovich
(74) *Attorney, Agent, or Firm* — Acuity Law Group, PC; Michael A. Whittaker

(57) ABSTRACT

The present invention relates to a heat preservation shell (4) for an analyzer. At least one liquid passage (402) for conveying the liquid is embedded in a shell wall of the heat preservation shell. The liquid passage (402) is embedded in the shell wall of the heat preservation shell (4), on one hand, the liquid transported or preserved in the liquid passage is subjected to the heat preservation function of the heat preservation shell, so that the liquid transported or preserved in the liquid passage (402) maintains the preset temperature, thereby avoiding the influence of the external environment temperature on the transported liquid; and on the other hand, the space of the shell wall of the heat preservation shell is effectively utilized, the situation that various liquid pipelines are intricately distributed inside or outside the heat preservation shell (4) is avoided, thereby increasing the space utilization rate.

8 Claims, 12 Drawing Sheets

THERMAL INSULATION CASING FOR ANALYZER

CROSS-REFERENCE TO RELATED MATTERS

The present invention is filed under 35 U.S.C. § 371 as the U.S. national phase of International Patent Application No. PCT/CN2017/084087, filed May 12, 2017, which designated the United States and claims priority to Chinese Patent Application No. 201610311323.1, filed May 12, 2016, each of which is hereby incorporated in its entirety including all tables, figures and claims.

FIELD OF THE INVENTION

The invention relates to the technical field of full-automatic chemiluminescence immunoassay devices, in particular to a heat preservation shell for an analyzer.

BACKGROUND OF THE INVENTION

A full-automatic sample analysis device is applied to the technical field of sample analysis such as biochemical analysis, immunoassay, and fluorescence immunoassay and the like to detect substance contents in samples such as whole blood, plasma, serum or urine. In order to ensure accurate measurement results during the detection, temperature control is required at each stage of the reaction to maintain a constant temperature reaction environment. For example, in a washing and separation stage of magnetic beads, when the magnetic beads are washed by wash buffer, if the temperature of the wash buffer is low, the constant temperature environment is damaged. Therefore, the wash buffer needs to be heated before the washing. At a reactant detection stage, it is also necessary to heat the starter reagent to maintain the constant temperature reaction environment.

The prior art discloses an immunoassay device, including a magnetic bead washing and separation unit, a wash buffer heater and a starter reagent heater. When the immunoassay device washes the magnetic beads, the wash buffer and the starter reagent are respectively heated in advance, the heated wash buffer and the starter reagent are transported to a reaction cuvette through a pipeline, and temperature control is performed on the reaction cuvette in the magnetic bead washing process to reduce the influence of the environment temperature on the reaction. Although the above device heats the wash buffer and the starter reagent, there is a certain distance between the heater tube and the reaction cuvette, the tubes are exposed to the air, the wash buffer or the starter reagent exchanges heat with the air during the transportation, resulting in heat loss, so that the wash buffer or the starter reagent deviates from the preset temperature when being injected into the reaction cuvette, which affects the washing and separation effects of the magnetic beads, and ultimately affects the accuracy of sample analysis. When the environment temperature changes greatly, such as the temperature difference between the morning and the evening, or the temperature difference between the winter and the summer, it affects the temperature of the liquid transport pipeline, thus affecting the accuracy of test.

On the other hand, the wash buffer and the starter reagent in the prior art are respectively heated by two heaters, which not only occupies the space, but also increases the cost, thereby being disadvantageous for the miniaturization and the cost reduction of the device. Furthermore, the starter reagent for washing analysis of the magnetic beads is generally corrosive and has a corrosion resistance requirement for the heater for heating the starter reagent. However, the heating element of the heater is generally made of a metal material, and such a heating element is highly susceptible to corrosion in the space of corrosive liquid for a long time, thereby shortening the service life of the heater.

SUMMARY OF THE INVENTION

The technical problem to be solved by the present invention is to provide a heat preservation shell for an analyzer in view of the problem of large heat loss and difficult control of reaction temperature during the transportation of heating liquid in a liquid injection process of the analyzer in the prior art.

In order to solve the above problem, a first technical solution of the present invention is as follows:

A liquid heating transport device for an analyzer, including a liquid heater and a test tube seat, wherein the liquid heating transport device further includes a heat preservation shell, and the liquid heater and the test tube seat are both installed in the heat preservation shell.

Preferably, at least one liquid passage for conveying the liquid is embedded in a shell wall of the heat preservation shell, and the liquid passage is connected with a liquid outlet of the liquid heater.

Preferably, the liquid passage is a linear passage between the inlet and the outlet.

Preferably, the heat preservation shell is provided with a liquid chamber, the liquid chamber is the liquid chamber of the liquid heater, and the liquid chamber communicates with the inlet of the liquid passage.

Preferably, the liquid passage is embedded in a cover plate of the heat preservation shell.

Preferably, the liquid passage at least includes a first liquid passage for conveying a liquid and a second liquid passage for conveying another liquid.

Preferably, the liquid heater is provided with a liquid inlet tube and a liquid outlet tube, and the liquid outlet tube is installed inside the heat preservation shell.

Preferably, the liquid heater includes a heating element, and at least a first liquid chamber and a second liquid chamber, which do not communicate with each other in the heater, wherein at least one liquid chamber is accommodated in another liquid chamber, the heating element heats the liquid in one liquid chamber, and the heated liquid heats the liquid in the other liquid chamber.

Preferably, the liquid heater includes a heater for heating wash buffer and a heater for heating starter reagent.

Preferably, the analyzer is a full-automatic chemiluminescence immunoassay analyzer.

A second technical solution of the present invention is as follows:

An application of a liquid heating transport device for an analyzer in washing and separation of magnetic beads.

Preferably, the liquid heating transport device includes a liquid heater and a test tube seat, wherein the liquid heating transport device further includes a heat preservation shell, and the liquid heater and the test tube seat are both installed in the heat preservation shell.

Preferably, at least one liquid passage for conveying the liquid is embedded in a shell wall of the heat preservation shell, and the liquid passage is connected with a liquid outlet of the liquid heater.

Preferably, the liquid passage is a linear passage between the inlet and the outlet.

Preferably, the heat preservation shell is provided with a liquid chamber, the liquid chamber is the liquid chamber of the liquid heater, and the liquid chamber communicates with the inlet of the liquid passage.

Preferably, the liquid passage is embedded in a cover plate of the heat preservation shell.

Preferably, the liquid passage at least includes a first liquid passage for conveying a liquid and a second liquid passage for conveying another liquid.

Preferably, the liquid heater is provided with a liquid inlet tube and a liquid outlet tube, and the liquid outlet tube is installed inside the heat preservation shell.

Preferably, the liquid heater includes a heating element, and at least a first liquid chamber and a second liquid chamber, which do not communicate with each other in the heater, wherein at least one liquid chamber is accommodated in another liquid chamber, the heating element heats the liquid in one liquid chamber, and the heated liquid heats the liquid in the other liquid chamber.

Preferably, the liquid heater includes a heater for heating wash buffer and a heater for heating starter reagent.

Preferably, the analyzer is a full-automatic chemiluminescence immunoassay analyzer.

A third technical solution of the present invention is as follows:

A heat preservation shell for an analyzer, wherein at least one fluid passage for conveying fluid is embedded in a shell wall of the heat preservation shell, the fluid passage at least includes a first fluid passage for conveying one fluid and a second fluid passage for conveying another fluid, and the first fluid passage and the second fluid passage are arranged on different planes.

Preferably, the heat preservation shell includes a cover plate, and the fluid passage is embedded in the cover plate of the heat preservation shell.

Preferably, the heat preservation shell includes an enclosure, and the fluid passage is embedded in the enclosure of the heat preservation shell.

Preferably, the fluid passage is a linear passage between the inlet and the outlet.

Preferably, there are three first fluid passages, and the lengths and the apertures of the three first fluid passages are the same.

Preferably, a valve is arranged on the fluid passage, and the valve is installed on the heat preservation shell.

Preferably, the embedding means that the fluid passage is a hollow passage in the shell wall, and the tube wall of the fluid passage is part of the shell wall.

Preferably, a space for paving the fluid passage is reserved in the shell wall, and the fluid passage is paved in the shell wall in the form an independent pipeline.

Preferably, the fluid is selected from one of liquid or gas.

Preferably, the heat preservation shell is provided with a fluid chamber, and the fluid chamber communicates the inlet of the fluid passage.

Preferably, the fluid chamber is arranged in the heat preservation shell.

Preferably, the fluid chamber is arranged outside the heat preservation shell.

Preferably, the fluid is liquid, the fluid chamber is a liquid chamber, the fluid passage is a liquid passage, the liquid chamber takes the shape of a dome, the liquid outlet of the liquid chamber is connected to the highest location of the liquid level in the liquid chamber, and the liquid outlet communicates with the inlet of the liquid passage.

Preferably, the fluid is liquid, the fluid chamber is a liquid chamber, the fluid passage is a liquid passage, and the liquid chamber at least accommodates another liquid chamber, which communicates with the inlet of at least one liquid passage.

Preferably, the analyzer is a full-automatic chemiluminescence immunoassay analyzer.

Preferably, the liquid is selected from one of water, a solution, oil and other flowing liquid.

Preferably, the gas is selected from one of air, nitrogen, oxygen, hydrogen, an inert gas, and the like.

When the fluid is liquid, the fluid chamber is also referred to as a liquid chamber, the fluid passage is referred to as a liquid passage, the first fluid passage is referred to as a first liquid passage, and so on.

A fourth technical solution of the present invention is as follows:

A liquid heater for an analyzer, wherein the liquid heater includes a heating element, and at least a first liquid chamber and a second liquid chamber, which do not communicate with each other in the heater, wherein at least one liquid chamber is accommodated in another liquid chamber, the heating element heats the liquid in one liquid chamber, and the heated liquid heats the liquid in the other liquid chamber.

Preferably, both of the first liquid chamber and the second liquid chamber are closed chambers, and the first liquid chamber and the second liquid chamber respectively communicate with the outside through respective liquid outlets and liquid inlets.

Preferably, the heating element is installed in one liquid chamber

Preferably, the second liquid chamber is accommodated in the first liquid chamber, and the heating element is installed in the first liquid chamber.

Preferably, the second liquid chamber is made of a corrosion-resistant material.

Preferably, the volume of the second liquid chamber is smaller than that of the first liquid chamber.

Preferably, the first liquid chamber is accommodated in the second liquid chamber, and the heating element is installed in the first liquid chamber.

Preferably, the accommodated liquid chamber is of an annular tubular structure.

Preferably, the accommodated liquid chamber is installed and fixed by a bracket.

Preferably, the bracket is hollow cylindrical, and the bracket is coaxially installed on the heating element.

Preferably, one liquid chamber is used for storing wash buffer, and the other liquid chamber is used for storing starter reagent.

Preferably, the upper part of one liquid chamber takes the shape of a dome, and the liquid outlet of the liquid chamber is connected to the highest location of the liquid level in the liquid chamber.

Preferably, a heat preservation shell is connected to the liquid heater.

Preferably, the analyzer is a full-automatic chemiluminescence immunoassay analyzer.

A fifth technical solution of the present invention is as follows:

A liquid heating device includes a heating element, a liquid chamber, and a liquid outlet formed in the liquid chamber, the upper part of one liquid chamber takes the shape of a dome, and the liquid outlet of the liquid chamber is connected to the highest location of the liquid level in the liquid chamber.

Preferably, the dome is selected from a hemisphere, a semi-ellipsoid, a circular cone or a truncated cone.

Preferably, a protrusion is arranged on the inner surface of the top of the liquid chamber, and the liquid outlet is installed at a joint of the protrusion and the liquid chamber.

Preferably, the protrusion is a conical protrusion.

Preferably, there are three liquid outlets.

Preferably, the heating element is installed in the liquid chamber.

Preferably, a plurality of protrusions for heat dissipation are arranged on the outer surface of the heating element.

Preferably, the protrusion is selected from a spiral protrusion, an annular protrusion or a strip-shaped protrusion.

Preferably, the heating element is columnar shape, and the heating element is installed in the middle of the liquid chamber.

Preferably, the lower part of the liquid chamber is cylindrical.

A sixth technical solution of the present invention is as follows:

A magnetic bead adsorption device includes a heat preservation shell, and a plurality of magnetic adsorption units are embedded on a sidewall of the heat preservation shell.

Preferably, the plurality of magnetic adsorption units are distributed on the side wall of the heat preservation shell at intervals.

Preferably, the magnetic adsorption unit is a magnet.

Preferably, the magnet is in interference fit with the side wall of the heat preservation shell.

Preferably, the heat preservation shell includes a cover plate and an enclosure, and a plurality of through holes are formed in the cover plate.

Preferably, a shaft sleeve sleeves on the through hole, and the friction resistance of the shaft sleeve is smaller than that of the cover plate.

Preferably, the shaft sleeve includes an upper shaft sleeve and a lower shaft sleeve, which are distributed at intervals, and the upper shaft sleeve and the lower shaft sleeve are respectively sleeved at the upper end and the lower end of the through hole.

Preferably, the shaft sleeve is in interference fit with the through hole.

Preferably, there are four through holes, and the four through holes are evenly distributed on the cover plate.

Compared with the prior art, the present invention has the following beneficial effects:

The liquid heating transport device keeps the heat radiated by the liquid heater in the heat preservation shell through the heat preservation shell, thereby slowing down the heat dissipation and conduction speed, reducing the heat loss, making the environment in the heat preservation shell within a preset temperature range, avoiding the influence of the external environment temperature on the internal temperature of the heat preservation shell, ensuring the reaction stability and the test result accuracy of the analyzer during the liquid injection.

The liquid passage is embedded in the shell wall of the heat preservation shell, on one hand, the liquid transported or preserved in the liquid passage is subjected to the heat preservation function of the heat preservation shell, so that the liquid transported or preserved in the liquid passage maintains the preset temperature, thereby avoiding the influence of the external environment temperature on the transported liquid; and on the other hand, the space of the shell wall of the heat preservation shell is effectively utilized, the situation that various liquid pipelines are intricately distributed inside or outside the heat preservation shell is avoided, thereby increasing the space utilization rate.

The liquid chamber is arranged on the heat preservation shell, thus greatly shortening the liquid transport path, keep the heated liquid as hot as possible, and avoiding the heat loss of the liquid due to the large distance between the liquid chamber and the inlet of the liquid passage to reduce the temperature of the liquid. On the other hand, the liquid chamber is used as a part of the heat preservation shell, so that the liquid chamber accommodates the heated liquid and preheats the heat preservation shell, thereby improving the heat preservation effect of the heat preservation shell on the liquid passage and the inner space of the heat preservation shell.

The heat preservation shell not only can realize the heat preservation function, but also can provide support for the magnetic adsorption unit, thereby improving the space utilization rate.

As the shaft sleeve is connected to the through hole of the cover plate, on the one hand, guidance is provided for the penetration of an aspirating needle, and on the other hand, the friction resistance of the shaft sleeve is smaller than that of the cover plate, so that the aspirating needle penetrates through the through hole more smoothly, the degree of lubrication is increased, and the resistance during the penetration of the aspirating needle is smaller.

The liquid heater simultaneously heats at least two kinds of liquids which are not mixed in the heater through the heating element, so that the liquid in the at least one liquid chamber is not directly in contact with the heating element, and is indirectly heated by the heat conduction of the heated liquid, especially when the corrosive liquid is heated, the corrosive liquid is contained in the liquid chamber which is not in direct contact with the heating element, thereby avoiding the problem that the corrosive liquid corrodes the heating element, and the service life of the heating element is prolonged. On the other hand, the problems of large installation volume and high cost caused by separate heating by using two heaters are avoided, the volume of the liquid heater is reduced, and the cost is reduced. The liquid heater is not limited to use in the full-automatic chemiluminescence immunoassay analyzer.

Due to the dome-shaped structure of the liquid chamber, during exhaust, air bubbles cannot adhere to and stay on the smooth wall of the liquid chamber when venting. During the initialization process of the liquid heater, the air or air bubbles in the liquid chamber are squeezed to the top, and then are discharged from the liquid outlet smoothly, thereby preventing a liquid hanging phenomenon when the heater discharges liquid to the outside through the pipeline as the air bubbles are preserved in the liquid chamber, and that the liquid discharge volume is inaccurate.

BRIEF DESCRIPTION OF THE DRAWINGS

FIG. 6-1 is a sectional structure diagram of a liquid heating transport device.

FIG. 6-2 is a structural schematic diagram of an embodiment of a liquid chamber.

FIG. 7-1 is a structural enlarged view of site A in FIG. 7.

FIG. 7-2 is a partial sectional structure diagram of a shaft sleeve in the cover plate.

FIG. 7-3 is a schematic diagram of an explosive structure of connection of the cover plate with the heater and the shaft sleeve.

FIG. 8-1 is a structural schematic diagram of an embodiment in the heat preservation shell with the transparent cover plate.

FIG. 8-2 is a sectional structure diagram at three first liquid passages in the cover plate of the heat preservation shell.

FIG. 8-3 is a sectional structure diagram at a second liquid passage in the cover plate of the heat preservation shell.

FIG. 8-4 is a perspective structure diagram of the cover plate in the heat preservation shell.

FIG. 9-1 is a structural schematic diagram of an embodiment of a liquid heater.

FIG. 9-2 is a structural schematic diagram of another embodiment of a liquid heater.

FIG. 9-3 is a structural schematic diagram of yet another embodiment of a liquid heater.

FIG. 10-1 is a schematic diagram of an embodiment of the dome structure in the liquid heater.

DETAILED DESCRIPTION OF THE EMBODIMENTS

The present invention is further described in detail below with reference to the drawings and embodiments, but the protection scope of the invention is not limited thereto.

Figure 1:
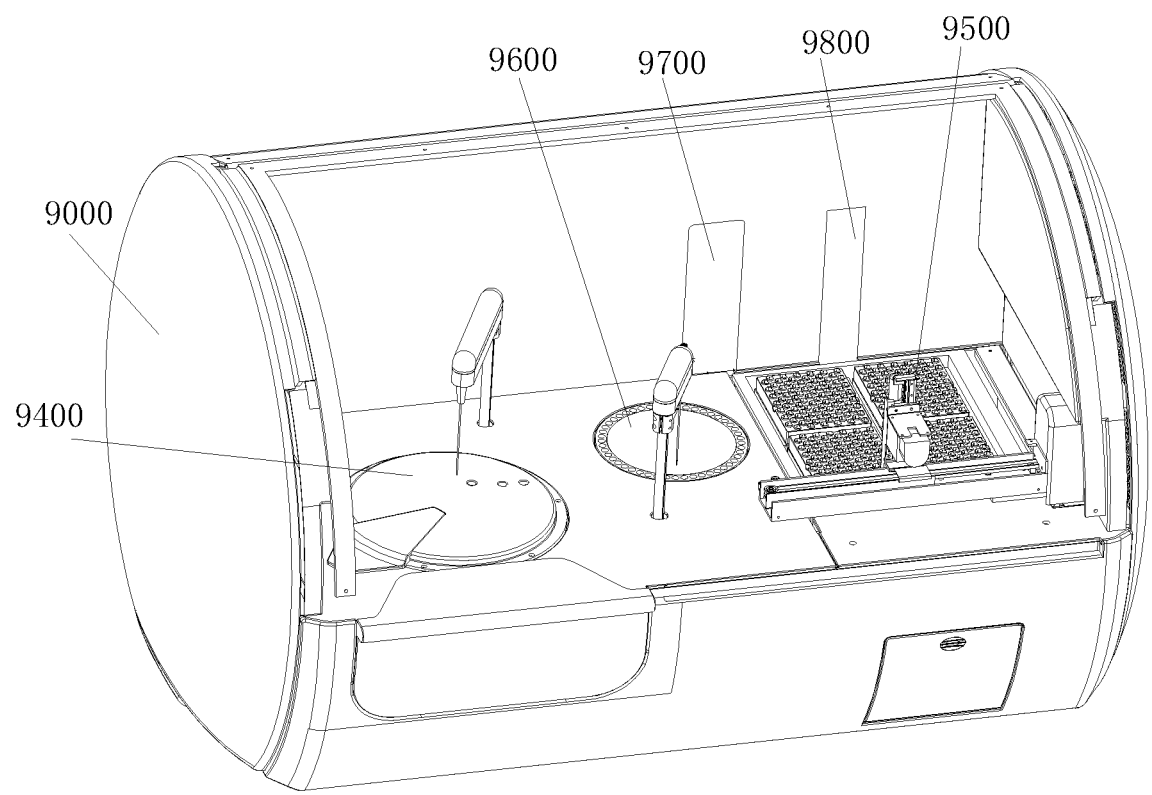
FIG. 1 is a structural schematic diagram of a full-automatic chemiluminescence immunoassay analyzer.
Figure 2:
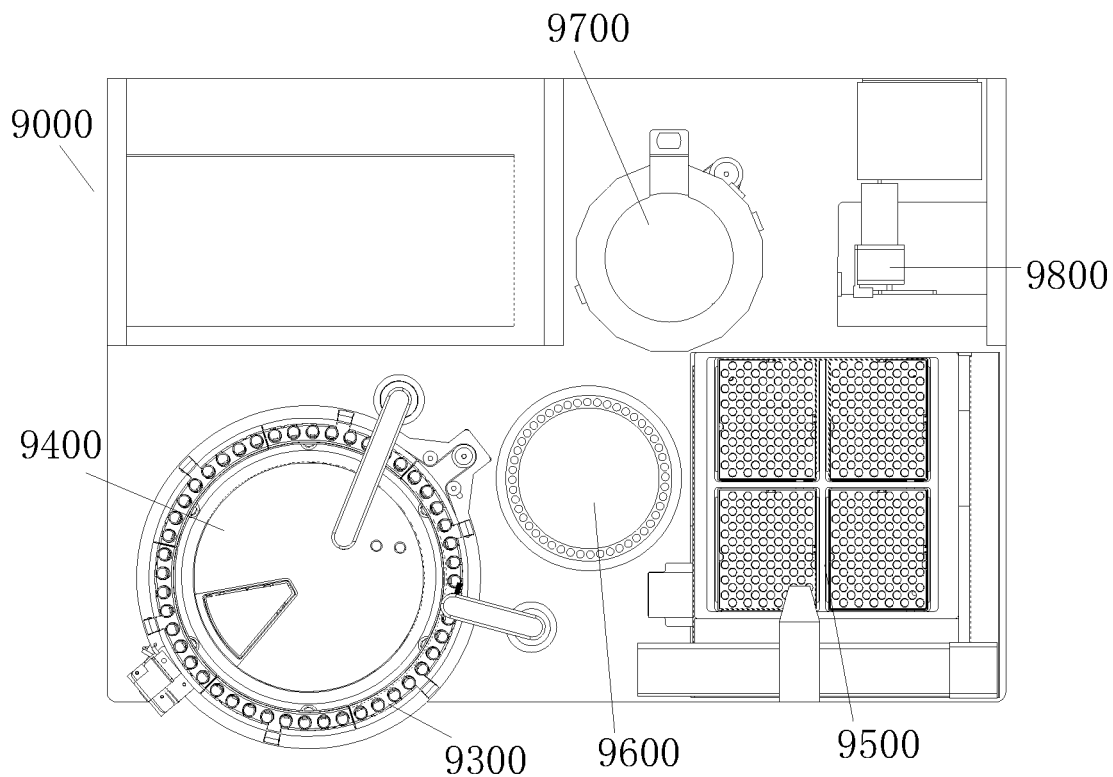
FIG. 2 is an inner structure diagram of a full-automatic chemiluminescence immunoassay analyzer.

A full-automatic chemiluminescence immunoassay analyzer 9000, as shown in FIGS. 1 to 2, includes a sample carousel 9300, a reagent carousel 9400, a reaction cuvette rack 9500, an incubation carousel 9600, a wash station 9700 and a reader module 9800. When a sample to be tested is subjected to component analysis, the sample and the reagent are respectively placed in the sample carousel and the reagent carousel, and the full-automatic chemiluminescence immunoassay analyzer takes out a reaction cuvette from a reaction cuvette rack 9500 and places it into the incubation carousel. Then, the sample and the reagent are added to the reaction cuvette according to a predetermined procedure, an incubation procedure is started, and after the incubation is completed, the reaction cuvette is placed in the wash station, wash buffer is added to the reaction cuvette for washing according to a predetermined procedure, starter reagent is added after the washing is completed, and finally the reaction cuvette is placed in the reader module to accomplish the sample composition analysis. The wash station 9700 includes a liquid heating transport device.

Figure 3:
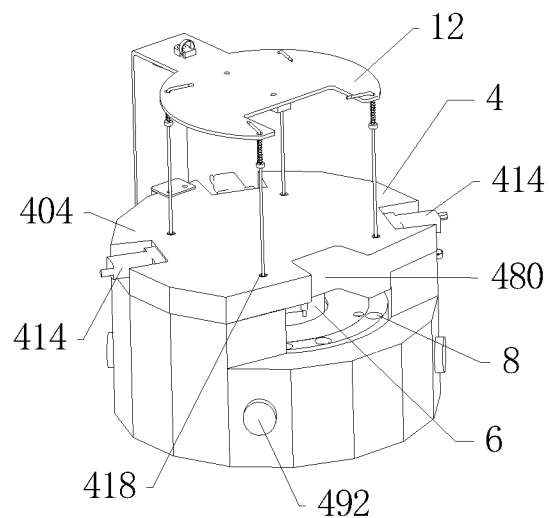
FIG. 3 is a structural schematic diagram of a liquid heating transport device for an analyzer.
Figure 4:
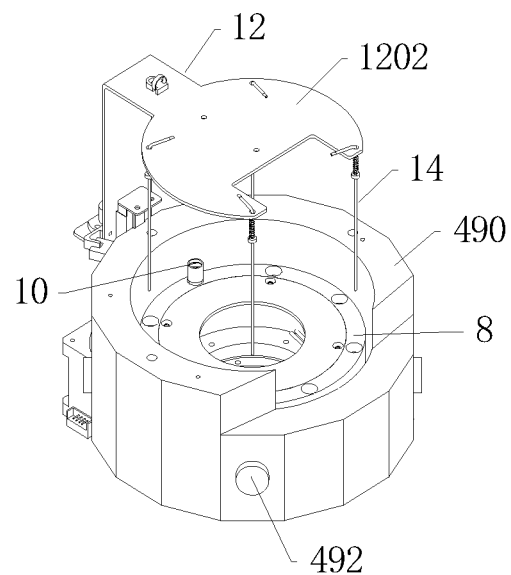
FIG. 4 is a structural schematic diagram in FIG. 3 with a cover plate and a heater removed.
Figure 5:
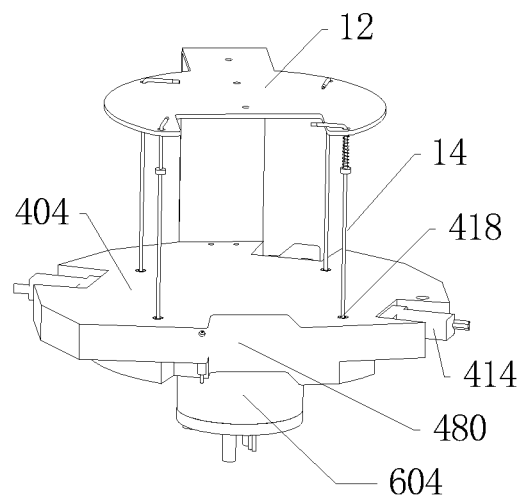
FIG. 5 is a connection structure diagram of a cover plate and a heater.

As shown in FIGS. 3 to 5, the liquid heating transport device includes a heat preservation shell 4, a liquid heater 6 and a test tube seat 8, and the liquid heater 6 and the test tube seat 8 are both installed in the heat preservation shell 4. The heat preservation shell 4 is used for providing a heat preservation environment for the liquid heater 6 and the test tube seat 8, and the liquid heater 6 is used for heating liquid needing to be injected into the analyzer. When the liquid heater heats the liquid, the heat emitted by the liquid heater is blocked by the heat preservation shell, so that the heat is maximally kept in the heat preservation shell, the heat preservation shell is arranged to slow down the heat dissipation and transport speed, prevent heat loss and locate the environment in the heat preservation shell within a preset temperature range, especially when the temperature difference between the morning and the evening and between the winter and the summer is large, the heat preservation shell can keep the temperature in the shell and prevent the heat loss at a low temperature, and block the external heat insulation at a high temperature to maintain the temperature in the heat preservation shell within a stable range and ensure the reaction stability and the test result accuracy during the liquid injection of the analyzer. The liquid heating transport device in the present embodiment is not limited to be applied to the full-automatic chemiluminescence immunoassay analyzer.

Figure 6:
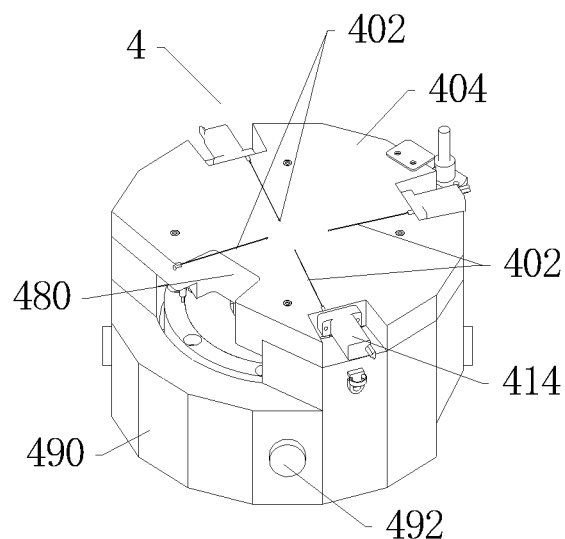
FIG. 6 is a structural schematic diagram of a liquid heating transport device with a cover plate in a partial perspective view.
Figures 1, 6:
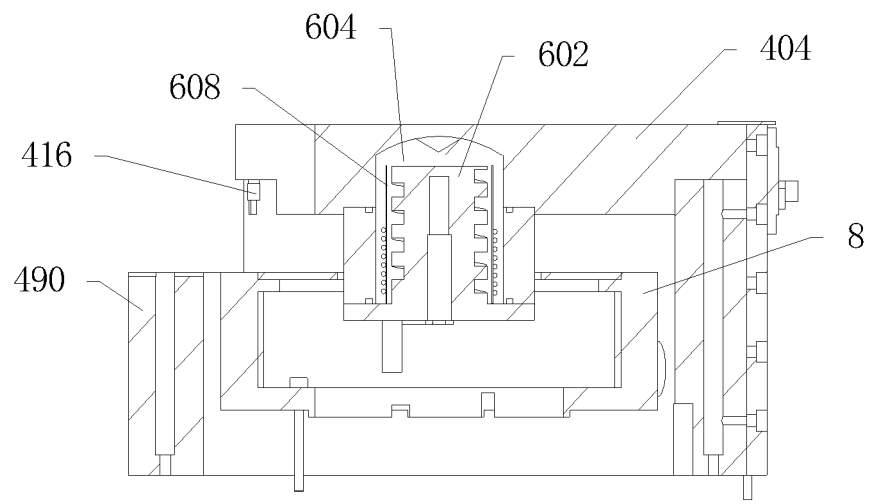
Figures 2, 6:
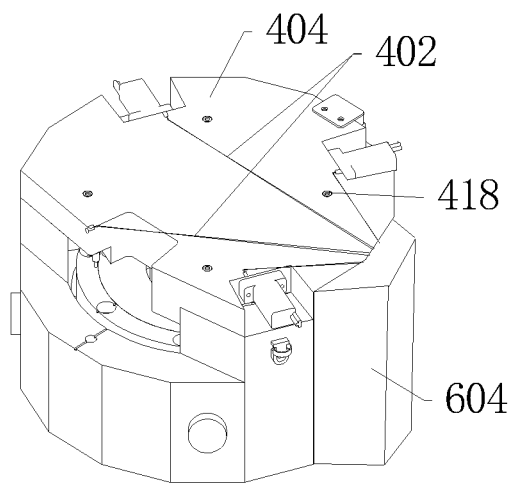
Figure 7:
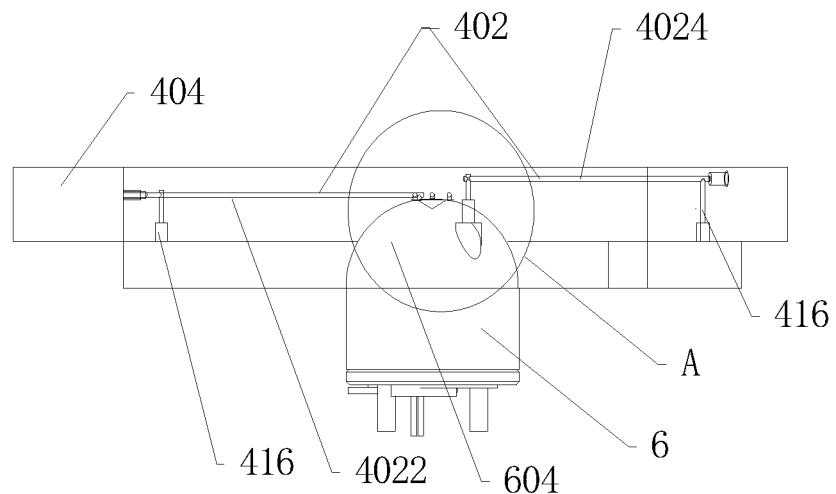
FIG. 7 is a connection structure diagram of a cover plate and a liquid chamber.
Figures 1, 7:
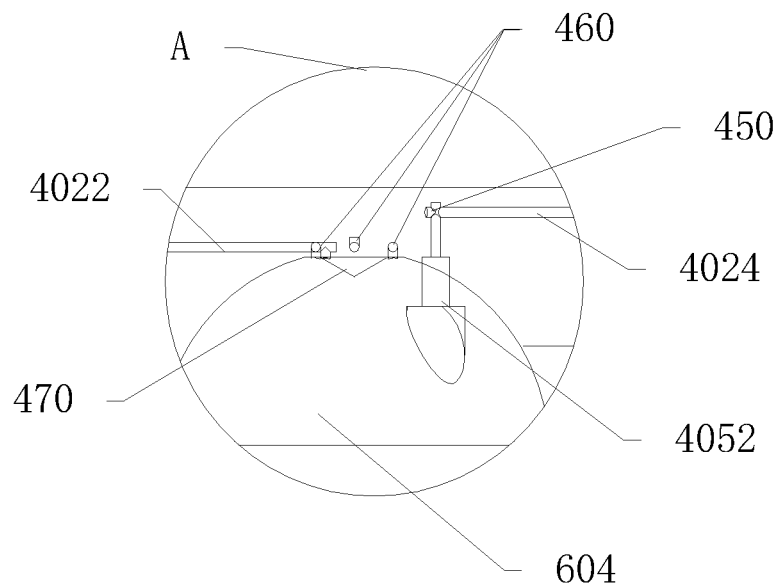
Figures 2, 7:
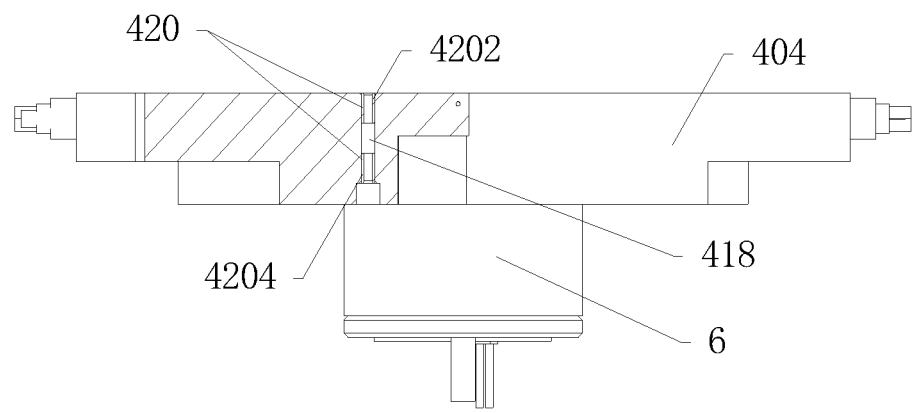
Figures 3, 7:
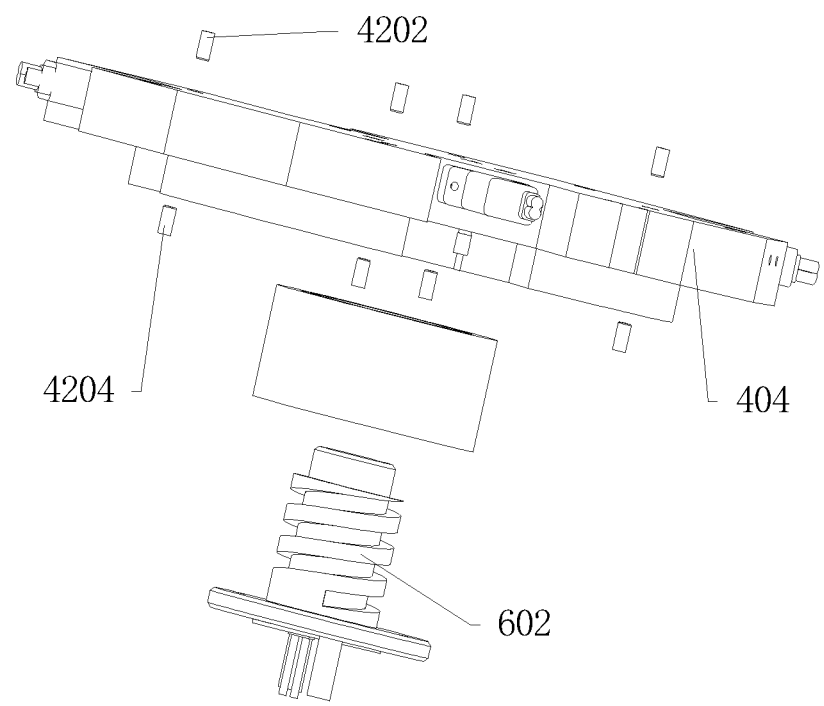

As shown in FIG. 6, at least one liquid passage 402 for conveying liquid is embedded in a shell wall of the heat preservation shell 4. As shown in FIG. 7, the embedding means that the liquid passage 402 is a hollow passage in the shell wall, that is, the tube wall of the liquid passage 402 is a part of the shell wall. The heat preservation shell 4 is used for preventing the heat loss in the shell and keeping the temperature stability, and the liquid passage is used for conveying the heated liquid into the reaction cuvette and maintaining the stability of the temperature of the liquid during the conveying. In another embodiment, a space for paving the liquid passage can also be reserved in the shell wall, and the liquid passage is paved in the shell wall in the form of an independent pipeline, the independent pipeline means that the pipeline and the shell wall of the heat preservation shell are independent, that is, the tube wall of the independent pipeline is not a part of the shell wall. The liquid passage is embedded in the shell wall of the heat preservation shell, on one hand, the liquid transported or preserved in the liquid passage is subjected to the heat preservation function of the heat preservation shell, the heat of the liquid in the liquid passage is blocked by the heat preservation shell, the heat dissipation speed is slowed, in this way, the liquid transported or preserved in the liquid passage maintains the preset temperature; and on the other hand, the space of the shell wall of the heat preservation shell is effectively utilized, the situation that various liquid pipelines are intricately distributed inside or outside the heat preservation shell is avoided, thereby increasing the space utilization rate. In the immunoassay analyzer, particularly during the washing and separation of magnetic beads, the wash buffer or the starter reagent needs to be added for multiple times at intervals, the wash buffer or the starter reagent preserved in the liquid passage is subjected to the heat preservation function of the heat preservation shell, therefore the heat loss of the liquid is small, and accurate temperature control of the wash buffer and the starter reagent is achieved, thereby effectively controlling the accuracy of the reaction temperature.

In order to increase the installation flexibility of the liquid passage, the liquid passage 402 is embedded at any position in the shell wall of the heat preservation shell 4. The liquid passage 402 can be embedded in an intermediate layer of the shell wall to form a sandwich structure; can also be embedded in the outermost layer of the shell wall, that is, the liquid passage is distributed along the surface layer of the shell wall. As an embodiment, the liquid passage can also be replaced by an independent pipeline attaching to the surface layer of the shell wall.

As shown in FIGS. 4 to 6, the heat preservation shell 4 includes an enclosure 490 and a cover plate 404, and the enclosure 490 is formed by surrounding side walls. The liquid passage 402 can be embedded in the shell wall at any position of the heat preservation shell 4, so that the heat preservation shell not only can achieve the heat preservation of the space in the shell, but also can achieve the heat preservation of the liquid passage. As shown in FIGS. 6 to 7, the liquid passage 402 is embedded in the cover plate 404 of the heat preservation shell 4. In another embodiment, the liquid passage 402 can also be embedded in the enclosure 490 of the heat preservation shell 4. There are multiple liquid passages 402, and the liquid passage 402 includes an inlet and an outlet. The heat preservation shell 4 takes the shape of an enclosure, and in one embodiment, the heat preservation shell 4 is columnar. As shown in FIG. 7, in another embodiment, the heat preservation shell 4 can also specifically refer to the cover plate 404, and the cover plate is used for performing heat preservation on the liquid passage.

The liquid passage 402 is a linear passage between the inlet and the outlet. In the liquid passage with the same diameter, the shorter the distance of the liquid passage is, the smaller the liquid capacity stored in the liquid passage is, therefore, the shortest liquid transport path between the two points from the inlet to the outlet is used, and the heat loss during the transport is relatively smaller. In another embodiment, the liquid passage can also be a curved passage.

Figure 8:
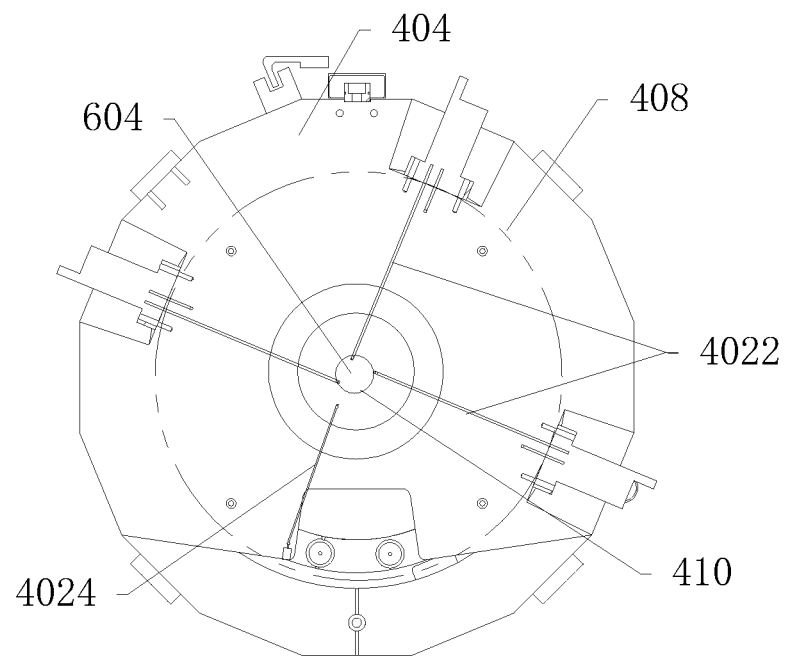
FIG. 8 is a perspective structure diagram of the cover plate in a heat preservation shell.
Figures 1, 8:
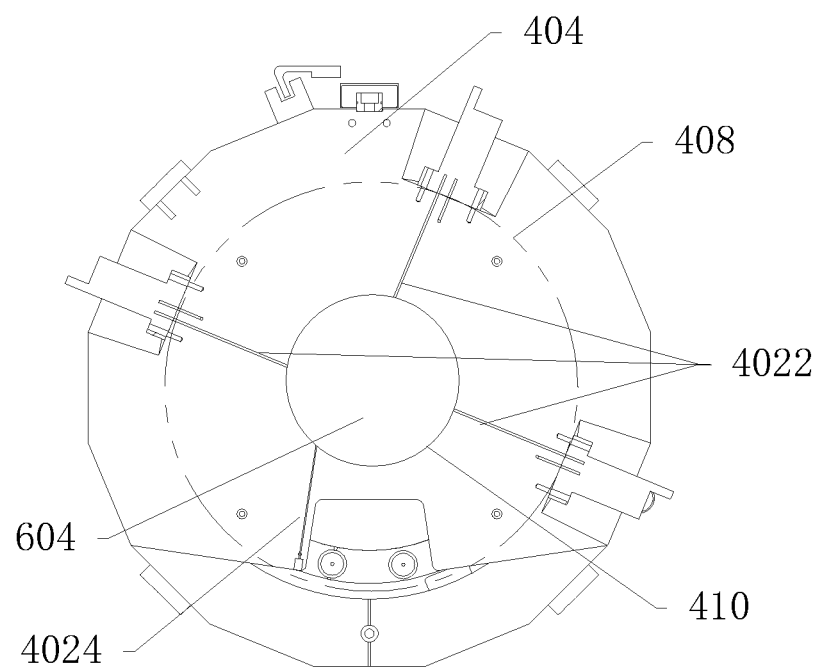
Figures 2, 8:
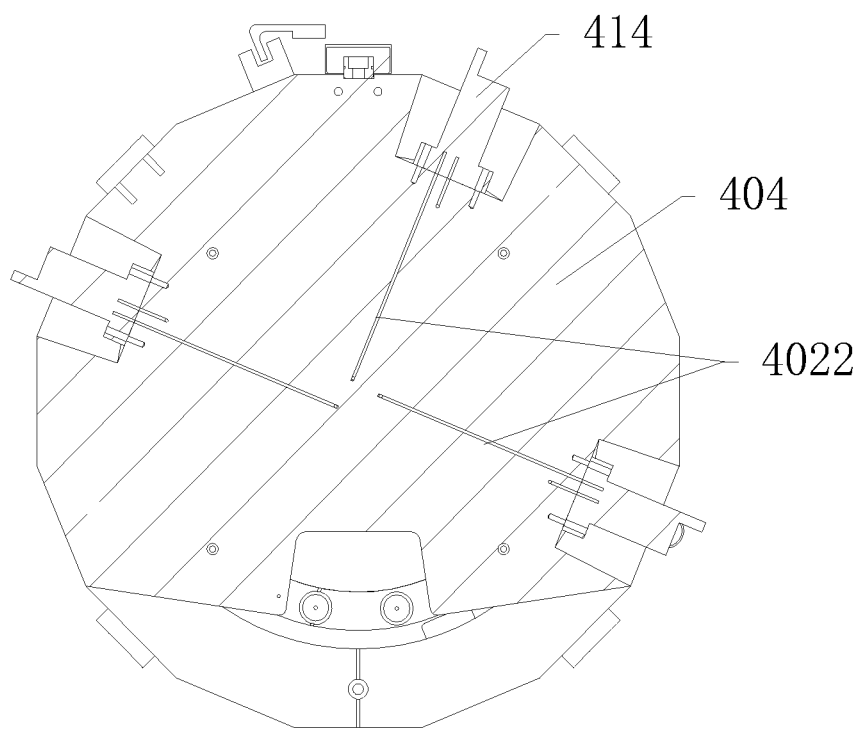
Figures 3, 8:
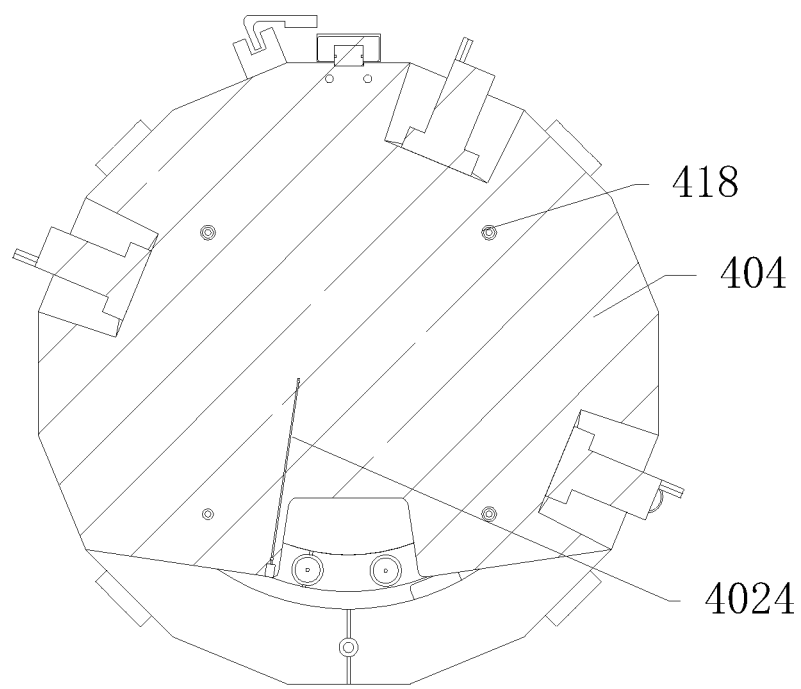
Figures 4, 8:
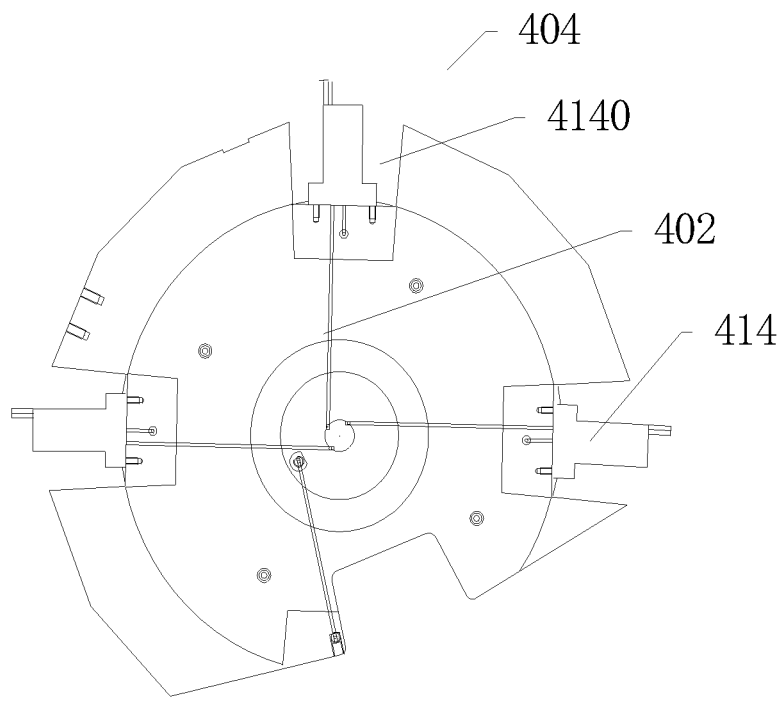

As shown in FIG. 8, the liquid passage 402 at least includes a first liquid passage 4022 for conveying a liquid and a second liquid passage 4024 for conveying another liquid. The second liquid passage 4024 is used for conveying heated liquid such as the starter reagent, and the first liquid passage 4022 used is for conveying another heated liquid such as the wash buffer. Further preferably, there are three first liquid passages 4022, and the lengths and apertures of the three first liquid passages are the same. Due to the equal length and equal aperture settings of the liquid passage, namely, the capacity of each liquid passage is the same, the heat loss of each liquid passage during the liquid transport is the same, that is, the heat loss of the heated liquid from the inlet of each liquid passage to the outlet is all the same, in this way, the temperature of the heated liquid conveyed by each liquid passage is nearly the same when being injected to the reaction cuvette, and the accurate temperature control of the reaction liquid is achieved.

The inlet and outlet of the liquid passage are respectively arranged on two circumferences with different diameters. As shown in FIG. 8-1, the inlet of the first liquid passage 4022 is arranged on an inner circle 410, and the outlet of the liquid passage 4022 is arranged on an outer circle 408, and the length of the liquid passage is the shortest distance between the inlet and the outlet. The inner circle 410 and the outer circle 408 are virtual circumferences used for specifying the installation positions of the inlet and outlet of the liquid passage. Preferably, there are three first liquid passages 4022 and one second liquid passage, and the three first liquid passages 4022 have the same length. Further preferably, as shown in FIG. 8, the inlet of the second liquid passage 4024 is arranged between the inner circle 410 and the outer circle 408 and slightly closer to the inner circle 408, the outlet is arranged on the outer circle 408, and the length of the second liquid passage 4024 is a linear passage between the inlet and the outlet. The length of the liquid passage in FIG. 8 is greater than the length of the liquid passage in FIG. 8-1, and the length of the liquid passage can be set according to design requirements. Further preferably, as shown in FIGS. 7, 8, 8-2 and 8-3, the three first liquid passages 4022 are distributed on the same plane, and the second liquid passage 4024 and the first liquid passage 4022 are spatially staggered, so that they are not on the same plane. The transport paths of the two liquids are not on the same plane, that is, the three liquid passages 4022 are on the same horizontal plane, and the other liquid passage 4024 is on the other horizontal surface, so that the positions of the inlet and outlet of the liquid passage 4024 are staggered with the positions of the inlets and the outlets of the other three liquid passages, and the connection between the inlet and the outlet of the liquid passage with different liquid chambers is facilitated.

As shown in FIGS. 8-2 and 8-4, the liquid passage 402 is provided with a valve 414, and the valve 414 is installed on the heat preservation shell 4. The valve 414 is controlled by a control system in the analyzer, and the opening and closing of the valve control the fluid passage of the liquid passage 402. Further preferably, the valve 414 is installed on the cover plate 404. The cover plate 404 is provided with a plurality of notches 4140 at the edges thereof, the notches 4140 are the installation positions of the valve 414, the valve 414 is connected to the outlet of the liquid passage 402, that is, the outlet of the liquid passage 402 is connected with the inlet of the valve 414. Further preferably, as shown in FIG. 7, an outlet pipeline 416 is connected to the outlet of the valve 414. The outlet pipeline 416 is a vertical pipeline, and the vertical pipeline 416 is connected to the inside of the heat preservation shell 4 by the outlet of the valve 414. Preferably, as shown in FIGS. 3 and 5, an opening 480 for placing the reaction cuvette 10 from the outside to the test tube seat in the heat preservation shell is formed in the heat preservation shell 4. Preferably, an upper cover for closing the opening 480 is arranged on the opening 480. When the reaction cuvette 10 is placed or taken out, the upper cover is opened, and during the washing, the upper cover is closed to achieve further heat preservation.

As another embodiment of the liquid passage, the liquid heater 6 is provided with a liquid inlet tube and a liquid outlet tube, and the liquid outlet tube is installed in the heat preservation shell 4. The liquid outlet tube of the liquid heater 6 is installed in the heat preservation shell 4, so that the liquid transported or preserved in the liquid outlet tube is subjected to the heat preservation function of the heat preservation shell, which is conducive to blocking the heat exchange between the liquid outlet tube and the outside of the heat preservation shell 4 and slowing down the heat dissipation speed of the liquid in the liquid outlet tube. During the installation, the liquid outlet tube can be suspended in the inner space of the heat preservation shell; or the liquid outlet tube can be attached to the inner surface of the heat preservation shell 4.

As shown in FIGS. 5 to 7, the heat preservation shell 4 is provided with a liquid chamber 604, and the liquid chamber 604 communicates with the inlet of the liquid passage 402. That is, at least a part of the chamber wall of the liquid chamber 604 is composed of the heat preservation shell 4, in other words, the liquid chamber 604 is a part of the heat preservation shell 4. The liquid chamber 604 is used for accommodating the heated liquid or to serving as a heating chamber of the heater, the liquid chamber 604 communicates with the inlet of the liquid passage 402, so that the heated liquid is heated and insulated by the liquid chamber, the heat preservation is achieved by the liquid passage during the transportation and preservation to maximally keep the heat of the heated liquid while shortening the transport path, and avoid the reduction of the temperature of the liquid due to the heat loss of the liquid caused by the large distance between the liquid chamber and the inlet of the liquid passage. On the other hand, the liquid chamber is used as a part of the heat preservation shell, so that the liquid chamber accommodates the heated liquid and preheats the heat preservation shell, thereby improving the heat preservation effect of the heat preservation shell on the liquid passage and the inner space of the heat preservation shell. In another embodiment, the liquid chamber can also be installed separately from the heat preservation shell, that is, the liquid chamber and the heat preservation shell are two independent individuals.

As shown in FIG. 7, the liquid chamber 604 is arranged in the heat preservation shell 4. The heat emitted by the heated liquid in the liquid chamber is blocked by the heat preservation shell, so that the heat is maximally kept in the heat preservation shell, which is favorable for maintaining the internal temperature stability of the heat preservation shell. According to the design requirements, the liquid chamber can be arranged in the heat preservation shell or outside the heat preservation shell, and meanwhile, the liquid chamber can directly communicate with the inlet of the liquid passage, that is, the liquid chamber is provided with a liquid outlet, the liquid outlet is the inlet of the liquid passage, namely, seamless connection, or communicates with the inlet of the liquid passage through a small section of pipeline.

As shown in FIG. 6-2, as an embodiment, the liquid chamber 604 is arranged outside the heat preservation shell 4, the liquid chamber 604 is installed on the side wall of the heat preservation shell 4, multiple liquid outlets are formed in the liquid chamber 604, the liquid outlets communicates with the liquid passage 402, the liquid passage 402 is radiated toward the cover plate 404 with the position of the liquid chamber 604 as the center. The liquid chamber 604 can be used as a part of the side wall of the heat preservation shell and can also be installed as an independent component separately from the heat preservation shell, and during the separate installation, in order to shorten the transport pipeline, the liquid chamber can be installed next to the heat preservation shell.

As shown in FIGS. 7, 8 and 8-1, the liquid outlet on the liquid chamber 604 is arranged on a circumference, the circumference is the inner circle 408, and the liquid chamber 604 communicates with the liquid passage 402 through the liquid outlet. As an embodiment, as shown in FIGS. 7 and 7-1, the liquid outlet on the liquid chamber 604 and the inlet of the liquid passage 4022 are both arranged on the inner circle 408, the liquid outlet of the liquid chamber 604 is used as the inlet of the liquid passage 4022, the heated liquid in the liquid chamber 604 can be directly input into the liquid passage 402 without additional bare pipeline drainage, in other words, the liquid chamber 604 is seamlessly connected with the liquid passage 402, and the bare pipeline refers to a pipeline directly exposed in the air; the inlet 450 of the liquid passage 4024 communicates with the liquid chamber 604 through an auxiliary pipeline 4052, the auxiliary pipeline 4052 is embedded in the cover plate 404, the auxiliary pipeline 4052 extends into the liquid chamber 604, or the liquid passage 4024 is directly connected to the liquid chamber 604 and directly communicates with the liquid chamber 604. The liquid chamber is seamlessly connected with the liquid passage, so that the heated liquid is heated and insulated by the liquid chamber, and is kept warm by the liquid passage during transportation and preservation, thereby maximally maintaining the heat of the heated liquid and avoiding the great reduction of the temperature of the liquid due to the heat loss of the liquid caused by the transport of the partially exposed pipeline.

As shown in FIG. 7, the liquid chamber 604 takes the shape of a dome, the liquid outlet of the liquid chamber 604 is connected at the highest position of the liquid level in the liquid chamber, and the liquid outlet communicates with the inlet of the liquid passage. The dome-shaped liquid chamber facilitates the rapid and complete elimination of air bubbles in the liquid chamber, and prevents the air bubbles from affecting the metering of the volume of the liquid to be filled. Further preferably, at least another liquid chamber is accommodated in the liquid chamber 604, the other liquid chamber communicates with the inlet of the at least one liquid passage. Another liquid chamber is accommodated in the liquid chamber 604, so that two kinds of liquid can be transported in different liquid passages.

As shown in FIGS. 3 to 6, in one embodiment, a plurality of magnetic adsorption units 492 are embedded in the side wall of the heat preservation shell 4. The heat preservation shell 4 not only can realize the heat preservation function, but also can provide support for the magnetic adsorption unit 492, thereby improving the space utilization rate. The magnetic adsorption unit 492 is used for adsorbing magnetic particles in the reaction cuvette. Preferably, the plurality of magnetic adsorption units 492 are distributed on the side wall of the heat preservation shell at intervals. The magnetic adsorption units 492 can be distributed at intervals or distributed continuously depending on the design requirements. Preferably, the magnetic adsorption unit 492 is a magnet. Preferably, the magnet is in interference fit with the side wall of the heat preservation shell 4. Due to the interference fit, the gap between the magnet and the heat preservation shell is small, thus avoiding the heat loss due to the gap between the magnet and the heat preservation shell. The heat preservation shell 4 in the present embodiment can be applied to a magnetic bead washing and separation reaction.

As shown in FIG. 3, in one embodiment, the cover plate 404 is provided with a plurality of through holes 418. The through hole 418 is used for providing a passage for an aspirating needle. Further preferably, as shown in FIGS. 7-2 and 7-3, a shaft sleeve 420 sleeves on the through hole 418, and the frictional resistance of the shaft sleeve 420 is smaller than that of the cover plate 404. The shaft sleeve 420 is connected to the through hole 418, on one hand, the penetration of the aspirating needle is guided, on the other hand, the frictional resistance of the shaft sleeve 420 is smaller than that of the cover plate 404, so that the aspirating needle can smoothly penetrate through the through hole, the degree of lubrication is improved, and the penetration resistance of the aspirating needle is smaller.

The shaft sleeve 420 includes an upper shaft sleeve 4202 and a lower shaft sleeve 4204, which are distributed at intervals, the upper shaft sleeve 4202 and the lower shaft sleeve 4204 are respectively sleeved at the upper end and the lower end of the through hole 418. The total height of the upper shaft sleeve and the lower shaft sleeve is smaller than the thickness of the through hole, as the upper shaft sleeve and the lower shaft sleeve are distributed at intervals, the function of guiding and lubricating the aspirating needle is achieved, the material of the shaft sleeve can be maximally save to reduce the cost. Further preferably, there are four through holes, and the four through holes are evenly distributed on the cover plate. A shaft sleeve is arranged on each through hole. Further preferably, the shaft sleeve 420 is in interference fit with the through hole 418. The cover plate in the embodiment is not limited to the cover plate of the heat preservation shell of the present invention, and the cover plate can also be a common cover plate having no heat preservation function, and the cover plate can be applied to various analyzers.

The liquid heater includes a heating element, and at least a first liquid chamber and a second liquid chamber, which do not communicate with each other in the heater, wherein at least one liquid chamber is accommodated in another liquid chamber, the heating element heats the liquid in one liquid chamber, and the heated liquid heats the liquid in the other liquid chamber. The situation that the first liquid chamber and the second liquid chamber do not communicate with each other in the heater means that the liquid in the first liquid chamber and the liquid in the second liquid chamber do not generate liquid convection in the heater, in other words, the two liquid chambers do not have a connecting line in the heater to connect the two liquid chambers to each other. The accommodation of at least one liquid chamber in another liquid chamber means that the liquid chamber is surrounded by the other liquid chamber, and the accommodated liquid chamber occupies a part of space of the other liquid chamber.

The liquid heater simultaneously heats at least two kinds of liquid that are not mixed in the heater through the heating element, so that the liquid in the at least one liquid chamber is not directly in contact with the heating element, but is indirectly heated through the heat conduction of the heated liquid, especially when corrosive liquid is heated, the corrosive liquid is accommodated in the liquid chamber which is not in direct contact with the heating element, thereby avoiding the problem that the corrosive liquid corrodes the heating element and prolonging the service life of the heating element. On the other hand, the problems of large installation volume and high cost caused by separate heating by using two heaters are avoided, the volume of the liquid heater is reduced, and the cost is reduced. The liquid heater is not limited to be applied to the full-automatic chemiluminescence immunoassay analyzer.

Figure 9:
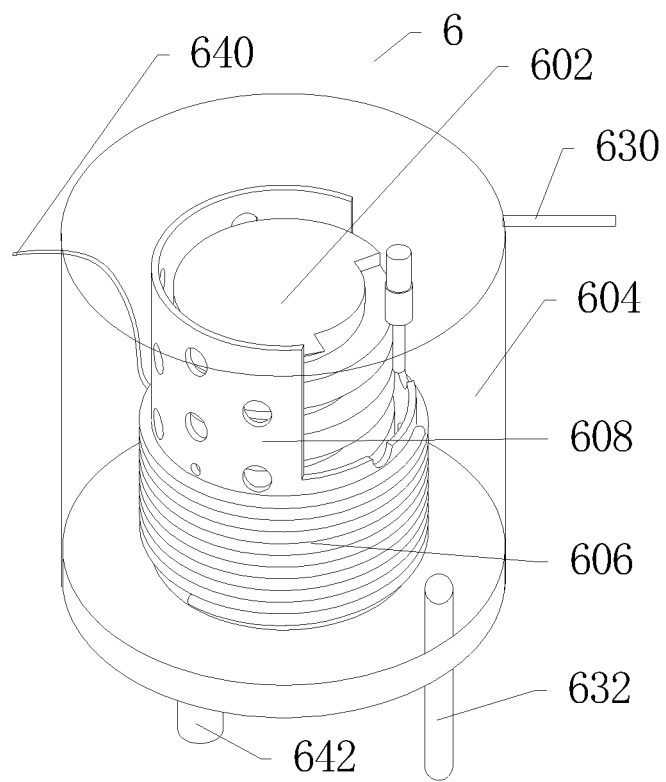
FIG. 9 is a perspective structure diagram of a liquid chamber in a liquid heater.
Figures 1, 9:
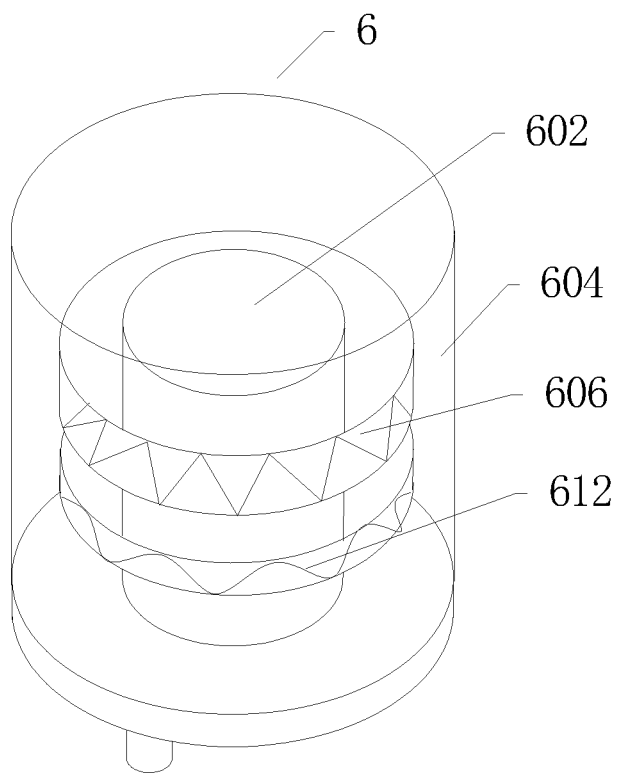
Figures 2, 9:
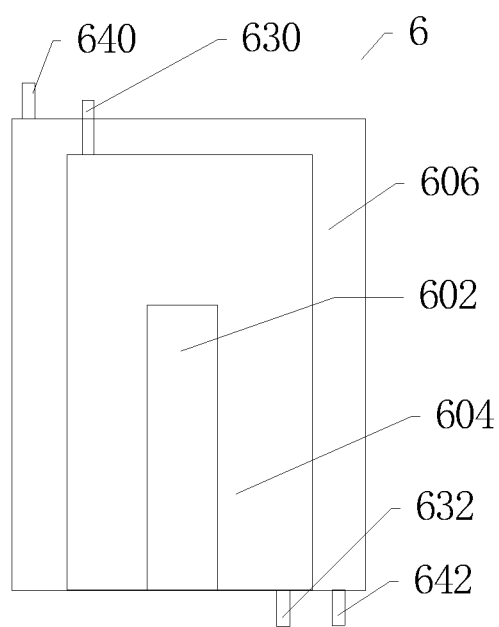
Figures 3, 9:
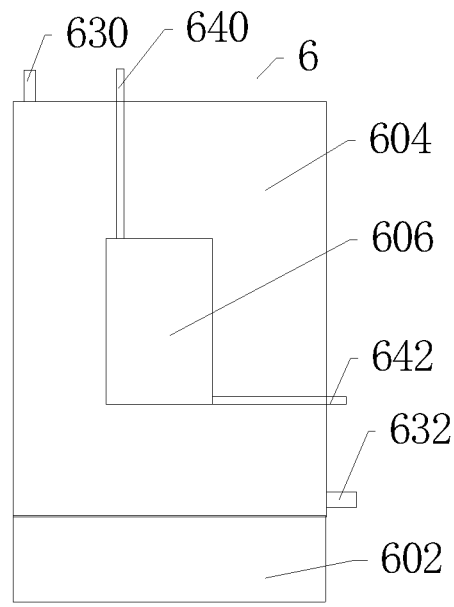

As shown in FIGS. 9, 9-1 and 9-2, the first liquid chamber 604 and the second liquid chamber 606 are both closed chambers, and the first liquid chamber 604 and the second liquid chamber 606 communicate with the outside through the respective outlets and inlets. That is, the first liquid chamber 604 and the second liquid chamber 606 respectively convey the liquid through independent liquid passages, the first liquid chamber 604 is provided with a liquid inlet 632 and a liquid outlet 630, and the second liquid chamber 606 is provided with a liquid inlet 642 and a liquid outlet 640. The closed chamber allows the heater to lose little heat during the heating. As an embodiment, the liquid inlet and the liquid outlet are respectively arranged at the bottom and the top of the heater, and the bottom and the top are the lowest and highest positions of the liquid level when the heater is filled with liquid.

As shown in FIGS. 9, 9-1 and 9-2, the heating element 602 is installed in one liquid chamber. The heating element is a component for heating the liquid, and the heating element is installed in the liquid chamber, so that the structure of the liquid heater is more compact and smaller, and the contact area of the heating element and the liquid is increased, and the heat dissipation rate of the heating element is increased. As shown in FIG. 9-3, as an embodiment, the heating element 602 can also be installed at the outside of the liquid chamber, and the technical effect of the present invention can also be achieved. The liquid heater includes a heating element 602 placed at the bottom and a liquid chamber 604 placed on the heating element, the liquid chamber 606 is accommodated in the liquid chamber 604, that is, the liquid chamber 604 encloses the liquid chamber 606, and the liquid chamber 606 is indirectly heated by the heated liquid. The liquid chamber 604 is provided with a liquid inlet 632 and a liquid outlet 630, the liquid chamber 606 is provided with a liquid inlet 642 and a liquid outlet 640, and the liquid in the two liquid chambers is transported through independent pipelines. Further preferably, the liquid heater 6 is columnar.

As shown in FIGS. 9 and 9-1, the second liquid chamber 606 is accommodated in the first liquid chamber 604, and the heating element 602 is installed in the first liquid chamber 604. The heating element 602 heats the liquid in the first liquid chamber 604, and the heated liquid surrounds the second liquid chamber 606 and exchanges heat with the liquid in the second liquid chamber 606 so that the liquid in the chamber 606 is heated. Further preferably, the heating element 602 is installed in the middle of the first liquid chamber 604. The heating element 602 is installed in the middle of the chamber, which facilitates uniform heat dissipation of the heating element 602 in the first liquid chamber. As an embodiment, the first liquid chamber 604 is a space between the heating element 602 and the heater shell, that is, a space filled with liquid in the first liquid chamber 604, and a part of the space in the first liquid chamber 604 is occupied by the second liquid chamber 606.

As shown in FIG. 9-2, the first liquid chamber 604 is accommodated in the second liquid chamber 606, and the heating element 602 is installed in the first liquid chamber 604. The heating element 602 directly heats the liquid in the first liquid chamber 604, and the heated liquid exchanges heat with the liquid in the second liquid chamber 606 to heat the liquid in the second liquid chamber 606. The first liquid chamber 604 is provided with a liquid inlet 632 and a liquid outlet 630, the second liquid chamber 606 is provided with a liquid inlet 642 and a liquid outlet 640, and the liquid in the two liquid chambers are conveyed by independent pipelines.

As shown in FIG. 9 and FIG. 9-1, the accommodated liquid chamber is of an annular tubular structure. The liquid chamber 606 of the annular tubular structure can surround the outer circumference of the heating element 602 so that the liquid in the accommodated liquid chamber is more uniformly heated. More preferably, as shown in FIG. 9, the accommodated liquid chamber is installed and fixed by a bracket 608. More preferably, the bracket 608 has a hollow cylindrical shape, and the bracket 608 is coaxially installed with the heating element 602. The hollow cylindrical bracket makes the liquid convection in the liquid chamber more smooth, and the heating is more uniform. Further preferably, the accommodated liquid chamber 606 is wound around the bracket. The liquid chamber 606 is formed into a tubular coiled structure to increase the surface area of the liquid chamber 606 in contact with the liquid surrounding it, which is conductive to quickly heating the liquid in the liquid chamber 606. As another embodiment, as shown in FIG. 9-1, there are two accommodated liquid chambers, which are respectively the second liquid chamber 606 and the third liquid chamber 612. The first liquid chamber 604 is a space between the heating element 602 and the heater housing, the second liquid chamber 606 and the third liquid chamber 612 are both annular structures, and are hollowly sleeved at the outside of the heating element 602. The liquid in the first liquid chamber 604, the second liquid chamber 606 and the third liquid chamber 612 are respectively transported through independent liquid path systems.

Preferably, the second liquid chamber is made of a corrosion resistant material. Preferably, the volume of the second liquid chamber is smaller than the volume of the first liquid chamber. In one embodiment, one liquid chamber is used for storing the wash buffer, and the other liquid chamber is used for storing the starter reagent. Further preferably, the accommodated liquid chamber is used for storing the starter reagent. Further preferably, the volume of the liquid chamber for storing the starter reagent is smaller than the volume of the liquid chamber for storing the wash buffer, to meet the needs of the analyzer for different liquid volumes when the liquid is involved in the reaction. When the magnetic beads are washed and separated, the wash buffer and the starter reagent need to be preheated, and the starter reagent is corrosive liquid. Therefore, the starter reagent is stored in the accommodated liquid chamber so as to avoid the direct contact between the starter reagent and the heating element and to prolong the service life of the heating element. Furthermore, the volume of the accommodated liquid chamber is small, and can be quickly heated by the peripheral liquid by heat transfer.

For the liquid heater in the liquid heating transport device, two kinds of liquid can be heated simultaneously by one heater, or can be separately heated by two independent heaters. The liquid heater includes a heater for heating the wash buffer and a heater for heating the starter reagent. The liquid heater heats the wash buffer and the starter reagent respectively through two heaters, and then respectively transports the heated wash buffer and the starter reagent to the reaction cuvette through respective pipelines.

Figure 10:
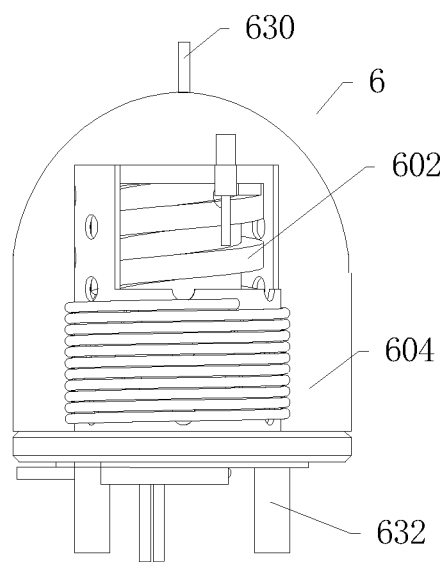
FIG. 10 is a schematic diagram of a dome structure in a liquid heater.
Figures 1, 10:
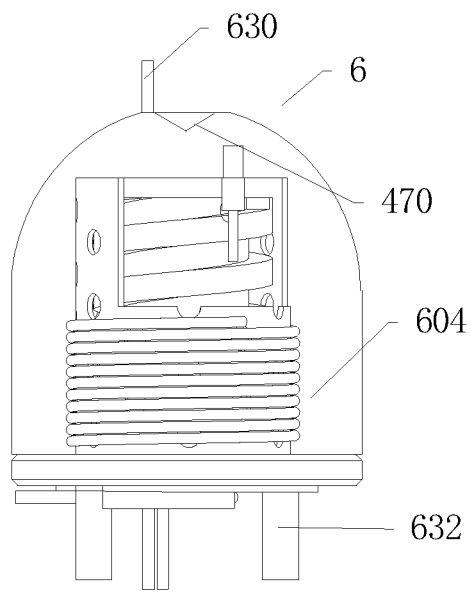

As shown in FIG. 10, in one embodiment, the liquid heater 6 includes a heating element 602, a liquid chamber 604, and a liquid outlet 630 and a liquid inlet 632 arranged on the liquid chamber, the upper part of the liquid chamber 604 takes the shape of a dome, and the liquid outlet 630 is connected at the highest position of the liquid level in the liquid chamber 604. The liquid heater injects liquid from the starter reagent inlet 632 under the control of the liquid path system, and after being heated by the heating element 602, the heated liquid is discharged from the liquid outlet 630 at the top of the liquid surface, and the liquid chamber 604 of the liquid heater is filled with liquid under normal operating conditions. The dome shape means narrowing from bottom to top of the upper part of the liquid chamber 604, in other words, a transitional curved surface from a larger cross-sectional area of the bottom to a smaller cross-sectional area of the top. The highest position of the liquid level in the liquid chamber 604 is the highest level of the liquid level when the heater is filled with liquid. The liquid outlet 630 is arranged at the highest position of the liquid level, which is advantageous for preferentially discharging the liquid having a higher temperature in the heater. The dome shape of the liquid chamber, that is, the curved surface shape, prevents the air bubbles from adhering to and staying on the wall of the liquid chamber during the venting, which facilitates the smooth discharge of the air bubbles in the heater. During the initialization process of the liquid heater, it is favorable for squeezing the air or the air bubbles in the liquid chamber to the top, and then the air or the air bubbles are smoothly discharged from the liquid outlet 630, thereby preventing a liquid hanging phenomenon when the heater discharges liquid to the outside through the pipeline as the air bubbles are preserved in the liquid chamber, and that the liquid discharge volume is inaccurate.

As shown in FIG. 10-1, a protrusion 470 is arranged on the inner surface of the top of the liquid chamber 604, the liquid outlet 630 is installed at a joint of the protrusion 470 and the liquid chamber 604. The liquid outlet 630 can be installed around a circle of the joint of the protrusion 470 and the liquid chamber 604, the circle of the joint is the highest position of the liquid level in the liquid chamber 604, and after the protrusion 470 is installed, the area at the highest position of the liquid level in the liquid chamber 604 is reduced, the air bubbles are concentrated in a small volume range at the liquid outlet 630, which facilitates the rapid discharge of the air bubbles. Further preferably, the protrusion 470 is a conical protrusion. Further preferably, there are three liquid outlets. Preferably, the heating element 602 is installed in the liquid chamber 604. Preferably, the lower part of the liquid chamber 604 is cylindrical. That is, the liquid chamber 604 includes a dome shape at the upper part and a column at the lower part. Preferably, the dome shape is selected from one of a hemisphere, a semi-ellipsoid, a cone or a truncated cone.

Figure 11:
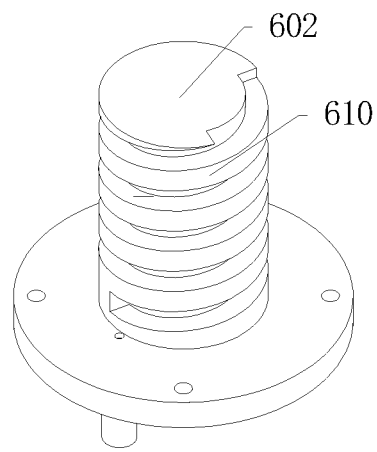
FIG. 11 is a structural schematic diagram of a heating element.

As shown in FIG. 11, a plurality of protrusions 610 for heat dissipation are installed on the outer surface of the heating element 602. The heat dissipation protrusion is used for increasing the contact area between the heating element and the liquid, so that the heating element accelerates the heat dissipation to achieve rapid heating. Further preferably, the protrusion 610 is selected from a spiral protrusion, an annular protrusion or a strip-shaped protrusion. More preferably, the heating element 602 is columnar, and the heating element 602 is installed in the middle of the liquid chamber 604.

When the liquid chamber 604 as shown in FIGS. 10 to 11 is applied to the liquid heating transport device, the liquid chamber 604 has the same concept as the first liquid chamber 604 except for the embodiment shown in FIG. 9-2.

As shown in FIGS. 3 to 4, the test tube seat 8 is used for placing the reaction cuvette 10, and a heating unit for heating the reaction cuvette 10 is further arranged in the liquid heating transport device. Preferably, the test tube seat 8 takes the shape of a circular ring. The circular ring-shaped test tube seat 8 is rotated by a driving structure. Preferably, the heating unit is used for heating the test tube seat 8, and the heated test tube seat 8 reheats the reaction cuvette 10. The heating unit heats the reaction cuvette in a direct or indirect manner to maintain the reaction cuvette at a preset temperature. The heating unit directly heats the reaction cuvette by using other methods such as hot air heating or water bath heating, or heats the reaction cuvette in an indirect manner, such as heating the test tube seat by the heating element, and then the heat is transferred to the reaction cuvette through the test tube seat. Regardless of the manner in which the reaction cuvette is heated, the heat dissipated by the reaction cuvette is retained by the heat perseveration shell and remains in the heat perseveration shell just like the heat emitted by the liquid heater. Therefore, the liquid heater and the test tube seat are installed in the heat preservation shell, the heat of the heat source in the heat preservation shell is maintained to the greatest extent, and the influence of the external environmental temperature change on the temperature in the heat preservation shell is avoided, which is conductive to performing accurate temperature control of the reaction process of the magnetic bead separation device and ensuring the accuracy of the reaction temperature.

As shown in FIGS. 3 to 5, the liquid heating transport device further includes a needle lifting frame 12, and a plurality of aspirating needles 14 are installed on the needle lifting frame 12. The needle lifting frame 12 includes a platform 1202 used for installing the aspirating needles 14, and four aspirating needles 14 are respectively installed on four corners of the platform 1202. The needle lifting frame 12 drives the platform 1202 and the aspirating needles 14 to move up and down by a lifting actuator to realize the action of aspirating or injecting liquid into the reaction cuvette 10.

As shown in FIGS. 3 to 11, in the application of the liquid heating transport device is used in the washing and separation of the magnetic beads, the liquid heating transport device includes a heat preservation shell 4, a liquid heater 6, a test tube seat 8 and a needle lifting frame 12, the liquid heater 6 and the test tube seat 8 are both installed in the heat preservation shell 4, the needle lifting frame is installed at the outside of the heat preservation shell, and a magnetic adsorption unit is arranged on the heat preservation shell 4.

As shown in FIG. 7, three first liquid passages 4022 for conveying the wash buffer and a second liquid passage 4024 for conveying the starter reagent are embedded in the shell wall of the cover plate of the heat preservation shell 4, the four liquid passages are all connected with the liquid outlet of the heater 6, and the first liquid passage 4022 and the second liquid passage 4024 are arranged on different horizontal planes. A liquid chamber 604 is concavely arranged on the cover plate of the heat preservation shell 4, the upper part of the liquid chamber 604 takes the shape of a dome, a protrusion 470 is arranged on the inner surface of the top of the liquid chamber 604, the liquid outlet 630 is installed at the joint of the protrusion 470 and the liquid chamber 604, that is, the inlet 460 of the first liquid passage 4022 is directly connected with the liquid outlet 630, and the inlet 450 of the second liquid passage 4024 extends into the liquid chamber 604 through the auxiliary pipeline 4052. As shown in FIG. 7, a valve 414 is connected to the outlet of the liquid passage, and an outlet pipeline 416 is connected to the valve 414.

The liquid chamber 604 is the chamber wall of the liquid heater 6, the chamber wall includes a dome shape at the upper part and a column at the lower part, a heating element 602 is installed in the middle of the liquid chamber 604, that is, the middle of the first liquid chamber 604, a second liquid chamber 606 is accommodated in the liquid chamber 604, the first liquid chamber 604 is provided with a liquid inlet 632 and a liquid outlet 630, the second liquid chamber 606 is provided with a liquid inlet 642 and a liquid outlet 642, and the liquid outlet 630 of the first liquid chamber 604 is connected with the inlet 460 of the first liquid passage 4022, the liquid outlet 640 of the second liquid chamber 606 is connected with the inlet 450 of the second liquid passage 4024 to realize simultaneous heating and separate heat preservation transport of two kinds of liquid. The second liquid chamber 606 is of an annular coiled tubular structure, and the annular coiled tubular structure is fixedly installed in the first liquid chamber 604 through a hollow bracket 608, and the hollow bracket 608 is coaxially installed with the heating element 602.

When the liquid heating transport device performs the washing and separation of magnetic beads, firstly, the liquid heater 6 heats the wash buffer in the first liquid chamber 604 through the heating element 602, and heats the acid in the second liquid chamber 606 through the heated wash buffer. Then, the analyzer places the reaction cuvette 10 with the reaction liquid and the magnetic beads into a magnetic bead washing and separation device. Then, the position of the reaction cuvette is switched according to a predetermined program, and the reaction cuvette is intermittently moved on a reaction position with a magnet and a reaction position without a magnet; on the reaction position without a magnet, the liquid path system controls the wash buffer in the first liquid chamber 604 to be injected into the reaction cuvette through the first liquid passage 4022, and on the reaction position with the magnet, controls the needle lifting frame to drive the aspirating needle to aspirate the wash buffer in the reaction cuvette. After multiple turns of washing, the fluid control system injects the acid in the second liquid chamber 606 into the reaction cuvette through the second liquid passage 4024. Finally, the analyzer transfers the reaction cuvette subjected to the magnetic bead separation and washing to the reader module to accomplish the sample component analysis.

In the test of the thermal energy loss of the liquid heating transport device, the test is carried out according to two groups of temperatures. In the experimental group 1, the liquid in the first liquid chamber and the second liquid chamber is heated to 41° C., and the liquid in the first liquid chamber and the second liquid chamber in the experimental group 2 is heated to 37° C., and continuous heating is kept in the test process. The liquid heater transports liquid to the reaction cuvette through the liquid passage after every 60 s, and measures the temperature of the liquid in the reaction cuvette. Each group of experiments is repeated for 20 groups, and the experimental results are shown in Table 1.

TABLE 1

Table of discharge liquid temperature in liquid heating transport device

| | Experimental group 1 | | Experimental group 2 | |
|---|---|---|---|---|
| | Test conditions | | | |
| | Setting the temperature of two kinds of liquid in the heater as 41° C. Discharging the liquid after every 60 S | | Setting the temperature of two kinds of liquid in the heater as 37° C. Discharging the liquid after every 60 S | |
| Solution | Temperature of acid | Temperature of wash buffer | Temperature of acid | Temperature of wash buffer |
| 1 | 36.2 | 35.9 | 33 | 33.2 |
| 2 | 36 | 35.7 | 33.3 | 32.9 |
| 3 | 36.1 | 36.1 | 33 | 33.6 |
| 4 | 35.8 | 35.8 | 33.2 | 33.2 |
| 5 | 35.6 | 36.3 | 33.1 | 33 |
| 6 | 35.9 | 36.2 | 33.3 | 33.4 |
| 7 | 36 | 35.9 | 33.3 | 33.4 |
| 8 | 36 | 36.3 | 33.3 | 33.4 |
| 9 | 35.9 | 36.2 | 33.3 | 33.7 |
| 10 | 35.9 | 36.4 | 33 | 33.3 |
| 11 | 36 | 36.2 | 33.4 | 33.3 |
| 12 | 36 | 36.4 | 33.1 | 33.3 |
| 13 | 36.2 | 36.4 | 33.3 | 33.2 |
| 14 | 36.2 | 36.4 | 33.2 | 33.3 |
| 15 | 36.1 | 36.4 | 33.6 | 33.2 |
| 16 | 36.3 | 36.4 | 33.6 | 33.3 |
| 17 | 35.8 | 36.4 | 33.4 | 33.1 |
| 18 | 36.2 | 36.5 | 33.7 | 33.4 |
| 19 | 35.7 | 36.5 | 33.6 | 33.4 |
| 20 | 35.9 | 36.3 | 33.5 | 33.5 |
| Average value | 35.99 | 36.23 | 33.31 | 33.3 |

According to the above experimental results, when the heating temperature is 41° C., the average temperature of the acid added to the 20 groups of reaction cuvettes is 35.99° C., and the average temperature of the wash buffer added to the 20 groups of reaction cuvettes is 36.23° C. The heating temperature is 37° C., and the average temperature of the acid added to the 20 groups of reaction cuvettes is 33.31° C., and the average temperature of the wash buffer added to the 20 groups of reaction cuvettes is 33.30° C. The experimental results show that at the same heating temperature, the temperature difference of each group of reaction cuvettes is small after every 60 s, the temperature of the solution in each group of reaction cuvettes is very stable, and after the heated liquid is conveyed by the heater through the liquid passage, the heat energy loss is small, the liquid heating transport device meets the precise temperature control requirements, and long-term heat preservation can be achieved to meet the reaction temperature requirements of the analyzer.

What is claimed is:

1. An analyzer, comprising:
a first liquid chamber configured to store a first reagent for use by the analyzer in analyzing a sample;
a second liquid chamber configured to store a second reagent for use by the analyzer in analyzing the sample;
a heating element configured to heat the first and second reagents within the first and second liquid chambers;
a reaction cuvette;
a heat preservation shell comprising side walls and a cover plate forming an enclosure for said liquid chambers, wherein the heat preservation shell comprises at least one first fluid passage operably connected to the first liquid chamber and configured to convey the first reagent from the first liquid chamber to a reaction cuvette, and at least one second fluid passage operably connected to the second liquid chamber and configured to convey the second reagent from the second liquid chamber to the reaction cuvette, the first and second fluid passages configured as hollow passages in the heat preservation shell,
wherein the at least one first fluid passage is arranged within the side walls or cover plate of the heat preservation shell along a first axis and the at least one second fluid passage is arranged within the side walls or cover plate of the heat preservation shell along a second axis, wherein the first axis lies in a first plane and the second axis lies in a second plane that is parallel to the first plane such that the at least one first fluid passages and the at least one second fluid passages are spatially staggered within the side walls or cover plate of the heat preservation shell, and wherein the heat preservation shell maintains the temperature of the first and second reagents received from the first and second liquid chambers as the reagents traverse the first and second fluid passages to the reaction cuvette.

2. The heat preservation shell according to claim 1, wherein the at least one first and second fluid passages are arranged within the cover plate of the heat preservation shell.

3. The heat preservation shell according to claim 1, wherein the at least one first and second fluid passages are arranged within the side walls of the heat preservation shell.

4. The heat preservation shell according to claim 1, wherein the each at least one first fluid passages are configured as a linear passage.

5. The heat preservation shell according to claim 1, wherein there are three first fluid passages having the same length and cross-sectional area such that the capacity of each first liquid passage is the same.

6. The heat preservation shell according to claim 1, wherein a valve is arranged on each at least one first and second fluid passage, wherein opening and closing of the valve controls the fluid passage of its respective liquid passage, and wherein the valve is installed on the heat preservation shell.

7. The heat preservation shell according to claim 1, wherein the first and second reagents are independently selected from a liquid or gas.

8. The heat preservation shell according to claim 1, wherein the first liquid chamber takes the shape of a dome, the liquid outlet of the liquid chamber is connected to the highest location of the liquid level in the liquid chamber, and the liquid outlet communicates with the inlet of the one or more first liquid passages.

* * * * *